(12) United States Patent
Hayden

(10) Patent No.: US 12,203,442 B2
(45) Date of Patent: Jan. 21, 2025

(54) METHOD AND SYSTEM OF MANUFACTURING A WIND TURBINE BLADE

(71) Applicant: BLADE DYNAMICS LIMITED, Eastleigh (GB)

(72) Inventor: Paul Hayden, New Orleans, LA (US)

(73) Assignee: BLADE DYNAMICS LIMITED, Eastleigh (GB)

( * ) Notice: Subject to any disclaimer, the term of this patent is extended or adjusted under 35 U.S.C. 154(b) by 235 days.

(21) Appl. No.: 17/610,118

(22) PCT Filed: May 8, 2020

(86) PCT No.: PCT/US2020/032167
§ 371 (c)(1),
(2) Date: Nov. 9, 2021

(87) PCT Pub. No.: WO2020/231835
PCT Pub. Date: Nov. 19, 2020

(65) Prior Publication Data
US 2022/0364542 A1    Nov. 17, 2022

Related U.S. Application Data

(60) Provisional application No. 62/846,234, filed on May 10, 2019.

(51) Int. Cl.
*F03D 1/06* (2006.01)
*B29C 70/12* (2006.01)
(Continued)

(52) U.S. Cl.
CPC ............ *F03D 1/0675* (2013.01); *B29C 70/12* (2013.01); *B29C 70/222* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,579,861 | B2 | 2/2017 | Richler |
| 9,897,066 | B2 | 2/2018 | Hayden |
| (Continued) | | | |

FOREIGN PATENT DOCUMENTS

| | | | |
|---|---|---|---|
| EP | 3124785 | A1 | 2/2017 |
| WO | 2012092927 | A1 | 7/2012 |
| (Continued) | | | |

OTHER PUBLICATIONS

Office Action dated Jun. 12, 2023 issued in corresponding India Application No. 202147055540.

*Primary Examiner* — Binh Q Tran
(74) *Attorney, Agent, or Firm* — Nath, Goldberg & Meyer; Jerald L. Meyer; Tanya E. Harkins

(57) ABSTRACT

A wind turbine blade including a shell structure defining a leading edge and a trailing edge, and an upwind shell and a downwind shell joined along at least one of the leading edge or the trailing edge. The shell structure includes an assembly of preformed parts processed into a collection of prefabricated laminates. The invention also includes a method of manufacturing a wind turbine blade, the method includes processing a number of preformed parts into a collection of prefabricated laminates and assembling the collection of prefabricated laminates to build a shell structure defining a leading edge and a trailing edge.

20 Claims, 11 Drawing Sheets

(51) Int. Cl.
  *B29C 70/22* (2006.01)
  *B29K 105/08* (2006.01)
  *B29K 105/10* (2006.01)
  *B29L 31/08* (2006.01)

(52) U.S. Cl.
  CPC ............... *B29K 2105/0881* (2013.01); *B29K 2105/107* (2013.01); *B29L 2031/085* (2013.01); *F03D 1/0679* (2023.08); *F03D 1/0681* (2023.08); *F03D 1/0682* (2023.08); *F03D 1/0684* (2023.08); *F03D 1/0687* (2023.08); *F03D 1/0688* (2023.08); *F05B 2240/302* (2013.01); *F05B 2280/6003* (2013.01); *F05B 2280/6013* (2013.01)

(56) References Cited

U.S. PATENT DOCUMENTS

| | | | |
|---|---|---|---|
| 9,951,750 B2 | 4/2018 | Caruso et al. | |
| 11,187,203 B2* | 11/2021 | Badger | F03D 1/0675 |
| 2007/0251090 A1 | 11/2007 | Breugel et al. | |
| 2011/0081248 A1* | 4/2011 | Hibbard | F03D 1/0675 |
| | | | 29/889.7 |
| 2012/0082547 A1 | 4/2012 | Baker et al. | |
| 2014/0003955 A1 | 1/2014 | Richter | |
| 2015/0204200 A1 | 7/2015 | Eyb et al. | |
| 2015/0314536 A1 | 11/2015 | Smith et al. | |
| 2015/0316028 A1* | 11/2015 | Brekenfeld | F03D 1/0675 |
| | | | 156/196 |
| 2016/0377048 A1 | 12/2016 | Caruso et al. | |
| 2018/0223796 A1* | 8/2018 | Yarbrough | F03D 1/0675 |
| 2018/0238299 A1* | 8/2018 | Tobin | B29C 66/43 |
| 2018/0372065 A1* | 12/2018 | Livingston | F03D 1/0675 |
| 2019/0070801 A1 | 3/2019 | Lehmann Madsen | |
| 2019/0195191 A1* | 6/2019 | Girolamo | B29D 99/0028 |
| 2020/0095978 A1* | 3/2020 | Rodwell | B29D 99/0028 |
| 2021/0381494 A1* | 12/2021 | Aubrion | F03D 1/0675 |
| 2022/0134685 A1* | 5/2022 | Lund-Laverick | B29D 99/0028 |
| | | | 416/229 R |

FOREIGN PATENT DOCUMENTS

| | | |
|---|---|---|
| WO | 2013061016 A1 | 5/2013 |
| WO | 2014094787 A1 | 6/2014 |
| WO | 2019/212452 A1 | 11/2019 |

* cited by examiner

METHOD AND SYSTEM OF MANUFACTURING A WIND TURBINE BLADE

This is a National Phase Application filed under 35 U.S.C. 371 as a national stage of PCT/US2020/032167, filed May 8, 2020, an application claiming the benefit of U.S. Provisional Application No. 62/846,234 filed May 10, 2019, the content of each of which is hereby incorporated by reference in its entirety.

This invention generally relates to wind turbines and more specifically to wind turbine rotors or blades typically approaching lengths of 50 meters and more. However, it is readily applicable to other types of wind-exposed surfaces or aerofoil profiles negotiating aerodynamic forces, resistance and aerodynamics, such as helicopter rotor blades, or fan blades.

BACKGROUND

Modern wind turbines usually include a rotor with a considerable diameter size, as illustrated in FIG. 1. Referring to FIG. 1, a wind turbine 1 is typically mounted on a tower 2 and includes a wind turbine nacelle 3 positioned on top of the tower. The wind turbine rotor, including three wind turbine blades 5, is connected to the nacelle 3 through the low speed shaft, which extends out of the nacelle front. As illustrated in FIG. 1, wind beyond a certain level will activate the rotor due to the lift induced on the blades and allow it to rotate in a perpendicular direction to the wind. The rotation movement is converted to electric power, which is usually supplied to the transmission grid as known by skilled persons within the area.

Wind turbine blades for modern wind turbines are typically approaching lengths of 50 meters and more. Large three-bladed wind turbine blades typically rotate with tip speeds in the range of 75 to 100 meters per second. For some two-bladed turbines, the blades can rotate with a tip speed as high as 130 meters per second. This causes very severe aerodynamic conditions at the tip of the blade as well as along the outer ¼ of the leading edge, leading to blade loss in these areas. Although wind blades are typically expected to last for 20 years, this is often not the case due to the loss caused by aerodynamic conditions to the leading edge necessitating blade repair. However, repair of the leading edge is not easy since it is typically carried out with the blade still erected on the turbine. This also has significant cost and safety implications, particularly if the wind turbine is located offshore.

In order to create wind turbine blades that are capable of withstanding the significant forces of the wind as well as their own weight, the blades are constructed with two glass fiber shells and one or more internal glass fiber load-bearing beams, ribs etc., all adhered to each other.

Current wind turbine blades are typically made by laying rolls of fabric into large half molds to build up the blade laminate layer by layer in the mold. This conventional process has a number of shortcomings, namely it is slow and consumes a lot of time in the mold which is the process constraint, there is also a high risk of layup defects like wrinkles by depositing fabrics in such a way. The problems are getting worse as blades are getting bigger since a greater proportion of the blade cycle time is used to lay fabric into the mold. Another additional problem is that it is very hard to automate and reduce labor content of the blade manufacturing process due to the large and constantly changing scale of the blades.

Efforts have been made to try and automate the conventional process, but the constantly evolving scale of wind blades caused much of the investment to be lost when products change and also the sheer size of the entire component makes the investment very high.

There remains scope for improving automation and reducing labor content in manufacturing wind turbine rotors or blades.

STATEMENTS OF THE INVENTION

According to one aspect of the invention, there is provided a wind turbine blade including a shell structure defining a leading edge and a trailing edge, and an upwind shell and a downwind shell joined along at least one of the leading edge or the trailing edge. The shell structure includes an assembly of preformed parts processed into a collection of prefabricated laminates.

In a preferred embodiment, the shell structure includes a spar cap laminate made from a first plurality of spar cap preformed parts, a root laminate made from a second plurality of blade root preformed parts, and an aerodynamic fairing laminate made from a third plurality of aerodynamic fairing preformed parts. Preferably, each of the first plurality of spar cap preformed parts, the second plurality of blade root preformed parts, and the third plurality of aerodynamic fairing preformed parts has a mass less than 100 kg.

In another preferred embodiment, each of the first plurality of spar cap preformed parts, the second plurality of blade root preformed parts, and the third plurality of aerodynamic fairing preformed parts is less than 7.5 m in length.

In a further preferred embodiment, each of the first plurality of spar cap preformed parts, the second plurality of blade root preformed parts, and the third plurality of aerodynamic fairing preformed parts is created flat and configured to take a shape of the blade when assembled in plurality.

In yet another preferred embodiment, more than 60% of the first plurality of spar cap preformed parts, more than 60% of the second plurality of blade root preformed parts, and more than 60% of the third plurality of aerodynamic fairing preformed parts are identical.

In another preferred embodiment, each of the first plurality of spar cap preformed parts, the second plurality of blade root preformed parts, and the third plurality of aerodynamic fairing preformed parts includes one or more of: thermosetting or thermoplastic resin and further, each of the plurality of preformed parts includes one or more of: no fiber, short fiber or continuous fiber.

In another preferred embodiment, each of the first plurality of spar cap laminate preformed parts comprises predominantly greater that 70% unidirectional (UD) fiber. Advantageously, each of the first plurality of spar cap laminate preformed parts has tapered ends.

In another preferred embodiment, each of the second plurality of root laminate preformed parts comprises a mixture of UD fiber and +/−45 fiber. Advantageously, each of the second plurality of root laminate preformed parts has tapered ends.

In yet another preferred embodiment, each of the third plurality of aerodynamic fairing preformed parts comprises predominantly +/−45 fiber and a core. Advantageously, each of the third plurality of aerodynamic fairing preformed parts comprises a number of fabric layers and one layer of core.

In yet another preferred embodiment, the first plurality of spar cap preformed parts, the second plurality of blade root preformed parts, and the third plurality of aerodynamic fairing preformed parts comprises preformed parts that are not blade-specific and that further can be used to manufacture multiple products.

In one more preferred embodiment, the shell structure includes at least one shear web structure enclosed within, internally coupled to the shell structure and configured to provide structural integrity to the shell structure.

According to a second aspect of the present invention, there is provided a method of manufacturing a wind turbine blade. The method includes processing a number of preformed parts into a collection of prefabricated laminates and assembling the collection of prefabricated laminates to build a shell structure defining a leading edge and a trailing edge.

In a preferred embodiment, the assembling the collection of prefabricated laminate includes assembling a first plurality of spar cap preformed parts to build a first plurality of spar cap laminates, assembling a second plurality of blade root preformed parts to build a second plurality of blade root laminates, assembling a third plurality of aerodynamic fairing preformed parts to build a third plurality of aerodynamic fairing laminates, assembling said first plurality of spar cap laminates, said second plurality of blade root laminates and said third plurality of aerodynamic fairing laminates to build said upwind shell and said downwind shell. Preferably, each of the first plurality of spar cap preformed parts, the second plurality of blade root preformed parts, and the third plurality of aerodynamic fairing preformed parts has a mass less than 100 kg.

In another preferred embodiment, each of the first plurality of spar cap preformed parts, the second plurality of blade root preformed parts, and the third plurality of aerodynamic fairing preformed parts is less than 7.5 m in length.

In a further preferred embodiment, each of the first plurality of spar cap preformed parts, the second plurality of blade root preformed parts, and the third plurality of aerodynamic fairing preformed parts is created flat and configured to take a shape of the blade when assembled in plurality.

In yet another preferred embodiment, more than 60% of the first plurality of spar cap preformed parts, more than 60% of the second plurality of blade root preformed parts, and more than 60% of the third plurality of aerodynamic fairing preformed parts are identical.

In another preferred embodiment, each of the first plurality of spar cap preformed parts, the second plurality of blade root preformed parts, and the third plurality of aerodynamic fairing preformed parts includes one or more of: thermosetting or thermoplastic resin and further, each of the plurality of preformed parts includes one or more of: no fiber, short fiber or continuous fiber.

In another preferred embodiment, each of the first plurality of spar cap laminate preformed parts comprises predominantly greater that 70% unidirectional (UD) fiber. Advantageously, each of the first plurality of spar cap laminate preformed parts has tapered ends.

In another preferred embodiment, each of the second plurality of root laminate preformed parts comprises a mixture of UD fiber and +/−45 fiber. Advantageously, each of the second plurality of root laminate preformed parts has tapered ends.

In yet another preferred embodiment, each of the third plurality of aerodynamic fairing preformed parts comprises predominantly +/−45 fiber and a core. Advantageously, each of the third plurality of aerodynamic fairing preformed parts comprises a number of fabric layers and one layer of core.

In yet another preferred embodiment, the first plurality of spar cap preformed parts, the second plurality of blade root preformed parts, and the third plurality of aerodynamic fairing preformed parts comprises preformed parts that are not blade-specific and that further can be used to manufacture multiple products.

In one more preferred embodiment, the method includes providing structural integrity to said shell structure by internally coupling and enclosing at least one shear web structure within said shell structure.

Various other features will be apparent from the following detailed description and the drawings.

BRIEF DESCRIPTION OF THE DRAWINGS

An example of the present invention will now be described with reference to the following drawings in which.

DETAILED DESCRIPTION

Figure 1:
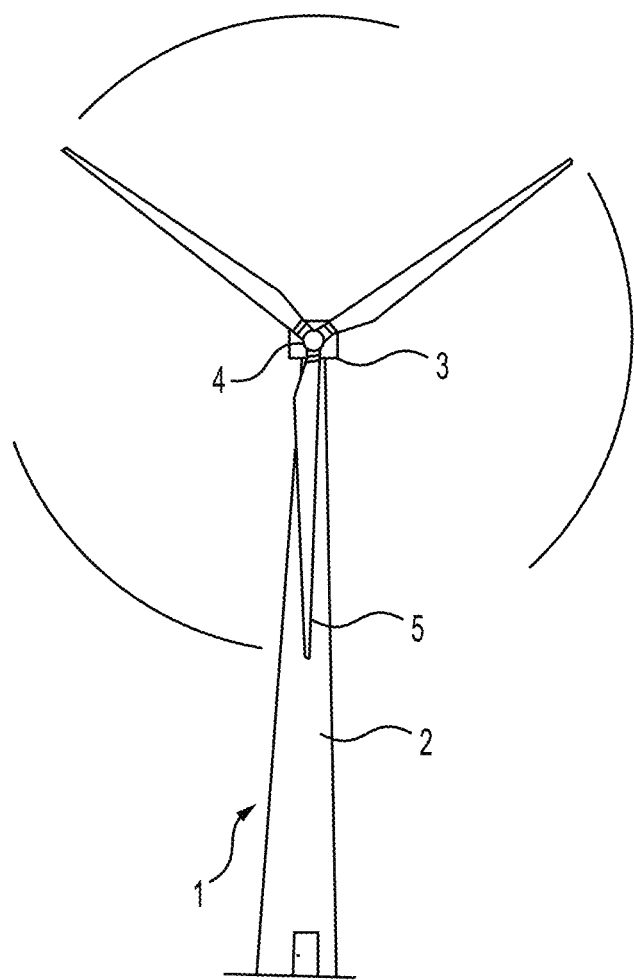
FIG. 1. illustrates a large modern wind turbine.

This invention includes embodiments that relate to wind turbines and more specifically to wind turbine rotors or blades. However, it is readily applicable to other types of wind-exposed aerofoil surfaces negotiating aerodynamic forces, resistance and aerodynamics, such as helicopter rotor blades, or fan blades.

One skilled in the art will recognize that it is possible to make sections of the wind turbine blade with one or more easily controllable and constructible, very small preformed parts. The parts are of a size that they no longer need large cranes to move them around and therefore can be moved around and placed into the mold by much faster and agile means than large cranes.

The parts are also designed such that they can be 'preformed' away from the main blade mold (preforming refers to the deposition of a number of layers into each part).

This helps in many ways. First, there is less likelihood of defects such as wrinkles, as the basic building blocks are smaller and more controllable. Second, the relatively smaller size of the typical preformed parts means that the blade manufacturing process can be more easily automated, thereby reducing labor and also increasing quality and deposition rate. Third, it opens up the possibility to preform the materials flat which means that they can be efficiently transported. This means that they could be preformed in another location and at another time and cost effectively transported to the final blade factory. Finally, the preforming process allows a number of more cost effective material types to be used that are cheaper and structurally more efficient.

The preformed parts typically consist of 2-10 layers of fabric which will be tapered at the ends and can be held together with adhesive, stitching or rivets. A significant number of identical preform parts can be used in the blade. This helps to reduce cost by driving standardization.

In operation, the preformed parts are then picked up, conveyed to the blade mold and then placed in the blade mold to the right accuracy. When the parts are placed into the mold they change shape and conform to the local shape of the mold. In one further embodiment of the invention, wherein the spar cap preformed parts, the blade root preformed parts, and the aerodynamic fairing preformed parts are not blade-specific and that further can be used to manufacture multiple different blade parts, products or components.

In one embodiment of the invention, each of the plurality of preformed parts has a mass less than 200 kg and preferably less than 100 kg. In another embodiment of the invention, each of the plurality of preformed parts is less than 12 m in length and preferably less than 7.5 m in length, so that the preform parts can fit in a shipping container In yet another embodiment of the invention, each of the plurality of preformed parts is created flat and configured to take a shape of the blade when assembled in plurality. In one further embodiment of the invention, each of the plurality of preformed parts forming the spar cap laminate has tapered ends.

In one embodiment of the invention, more than 50% and more preferably 60% of the plurality of preformed parts of each type, in other words spar cap laminate preforms, root laminate preforms, and aerodynamic fairing laminate preforms, are identical. In another embodiment of the invention, each of the plurality of preformed parts forming the spar cap laminate comprises predominantly less than 70% and preferably less than 90% unidirectional (UD) fiber. In one further embodiment of the invention, each of the plurality of preformed parts forming the root laminate comprises 60% UD fiber and 40%+/−45 fiber.

In one embodiment of the invention, each of the plurality of preformed parts comprises either thermosetting or thermoplastic resin and further wherein each of the plurality of preformed parts comprises no fiber, short fiber or continuous fiber.

In another embodiment of the invention, each of the plurality of preformed parts forming the aerodynamic fairing comprises predominantly +/−45 fiber and a core. In yet another embodiment of the invention, each of the plurality of preformed parts forming the aerodynamic fairing comprises a number of fabric layers and one layer of core.

Figure 2:
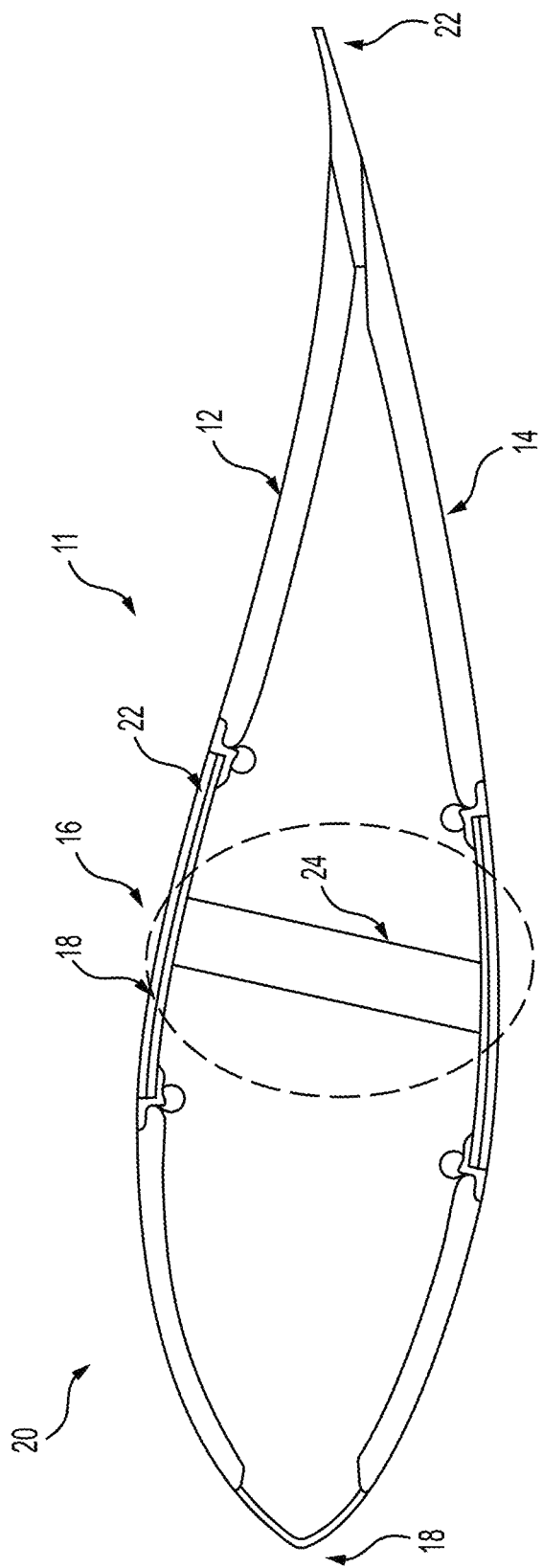
FIG. 2 illustrates a cross-sectional view of the wind turbine blade of FIG. 1.

FIG. 2 illustrates a cross-sectional view 20 of the wind turbine blade 5 of FIG. 1. Blade 5 includes downwind shell 12 and upwind shell 14 joined along a first longitudinal edge (leading edge) 18 and a second longitudinal edge (trailing edge) 22 to constitute a complete and closed shell structure 11. A typical shear web structure 16 including flanges, is enclosed within and internally coupled to the shell structure. The shear web structure 16 supports and provides structural integrity to the shell structure 11.

Figure 3:
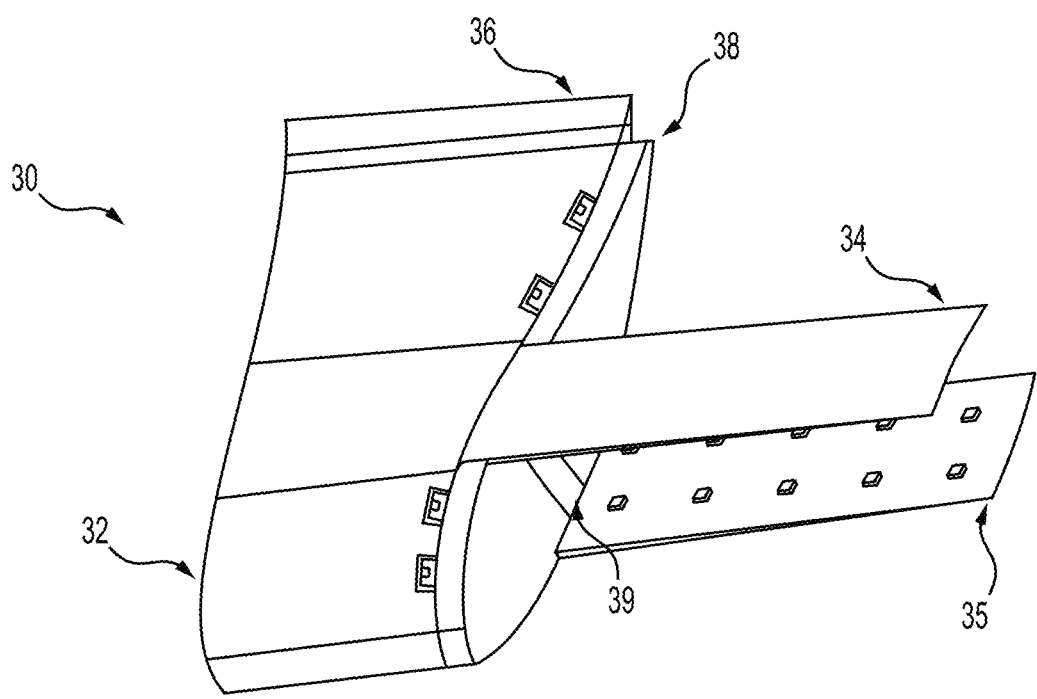
FIG. 3 illustrates a perspective view of the wind turbine blade of FIGS. 1-2.

FIG. 3 illustrates a perspective view of the wind turbine blade of FIGS. 1-2. Referring to FIG. 3, first and second spar cap laminates 34 and 35 are attached to blade segment 32. The first and second spar cap laminates 34 and 35 are configured to form an exemplary joint such as a scarf joint. The blade segment 32 is a hollow segments comprising outer skin 36. The skin is made from materials that is light-weight and strong. The spar cap 34 bear longitudinal-loads experienced by the wind turbine blades and are attached to the inside of the skin of the blade segments. The wind turbine blade 10 also includes a bulkhead 38 at the intersection of the blade segments. The bulkhead 38 further increases the structural strength of the wind turbine blade. Spar cap laminates 34 and 35 typically include a material such as fiberglass or carbon composites that are strong and capable of withstanding longitudinal loads.

Referring to FIGS. 1, 2, and 3, the bulkhead 38 is at the connection between outer skins of the first and second blade segments. A first portion of the flange of the bulkhead is bonded to the inside surface of the outer skin of the blade segment 32. The bulkhead 38 includes a leading edge bulkhead and a trailing edge bulkhead separated by a gap to accommodate a shear web 39 (16 in FIG. 2) for connecting the spar cap 34. The center portion of the bulkhead is represented by the sides of the leading edge bulkhead and the trailing edge bulkhead that face each other and is configured to accommodate the spar cap laminates 34 and 35 by including recesses dimensioned to receive the spar cap laminates 34 and 35. The bulkhead typically comprises materials such as fiberglass or carbon composite. The thickness of the bulkhead is typically 5-10 mm.

As shown in the embodiment of FIGS. 1, 2, and 3, the spar cap laminates 34 and 35 include tapered and non-tapered sections, and a distance between the two tapered sections remains substantially constant along the length of the tapered sections. As used herein, substantially constant typically means plus or minus 25 percent of the average gap. The shear web 39 of the spar cap laminates 34 and 35 connects the non-tapered sections of the first spar cap 34. The second spar cap 35 also includes tapered and non-tapered sections. The alignment occurs over the tapered sections of the first and second spar cap segments. Specifically, the outer sides of the tapered sections of the first spar cap 34 are straight while the inner sides are tapered till the end. The inner sides of the tapered sections of the second spar cap 35 are straight while the outer sides are tapered till the end. To form the alignment, the tapered inner sides of the first spar cap segments are positioned over the tapered outer sides of the second spar cap segments. This typically forms a scarf joint, as a non-limiting example. In a further example, the length of the tapered section is 20 to 80 times greater than the thickness of the non-tapered section for both the first and the second spar cap segments.

Referring to FIGS. 2 and 3, in one embodiment of the invention, the preformed parts are bonded together with bonding elements to form the wind turbine shell structure. In one embodiment of the invention the bonding elements or the adhesive means is a one or two-component adhesive such as epoxy, polyurethane or methacrylate adhesives and it is possible to create a bonding particularly durable in relation to the different kind of weather conditions a wind turbine blade is exposed to.

The different preformed parts are typically adapted to the section of the wind turbine blade they cover. Especially, the widths of the preformed parts vary in order to meet the different dimensions of the wind turbine blade at different positions e.g. the width at the root compared to the width at the tip. The height of the preformed parts, and thus the side-to-side length of the preformed parts, may also vary in order to meet the above-mentioned different dimensions of the wind turbine blade.

In a preferred embodiment, a preformed part preferably includes a width and height ranging between 0.02 and 0.2 meter in width and between 0.05 and 0.2 meter in height, corresponding to the shape of different parts of the wind turbine blade and has a thickness range between 0.1 and 5 mm preferably between 0.5 and 1.5 mm e.g. 0.5 mm at or close to the ends of the lip sections and 3 mm at the center of the preformed part. Further, the ends may advantageously be rounded in order to establish a smoother crossing to the wind turbine blade and in a preferred embodiment the adhesive layer is between 10 and 100 mm such as 50 mm.

Figure 4:
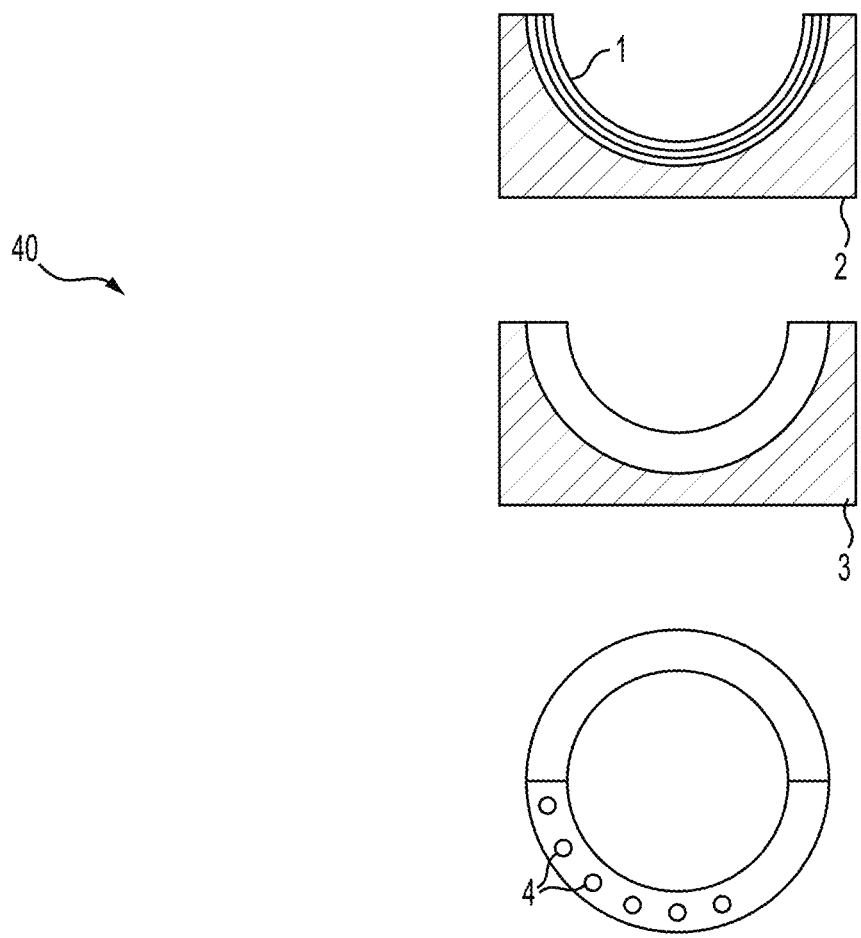
FIG. 4 illustrates a cross-sectional view of the root region of the wind turbine blade of FIGS. 1-3.

Referring to FIGS. 2, 3, and 4, shear web structures 16 typically include spar cap laminates mutually connected by two plates. The wind turbine blade shells and beam may be made in glass fiber reinforced plastics (GRP) i.e. glass fiber reinforced polyester or epoxy. However, other reinforcing materials may be used such as carbon fiber or aramid (Kevlar). Wood, wood-epoxy, wood-fiber-epoxy or similar composites may also be used as wind turbine blade materials.

In a preferred embodiment, a preformed part may typically be made of a number of materials or combinations of materials by several production methods. For instance, in a preferred embodiment the preformed part is made in plastic by an injection molding machine. In another embodiment casting in a mold is used to create the preformed part in glass fiber material or a similar fiber material such as carbon fiber or aramid material reinforcing an epoxy or polyester resin. Further, the preformed part may be manufactured in a thin metal plate e.g. in a rolled metal with the distance means welded or adhered to the plate. The metals are preferably chosen among the lighter metals such as aluminum. The preformed part may also be made of different materials such as a plastic plate with rubber distance means.

Figure 5:
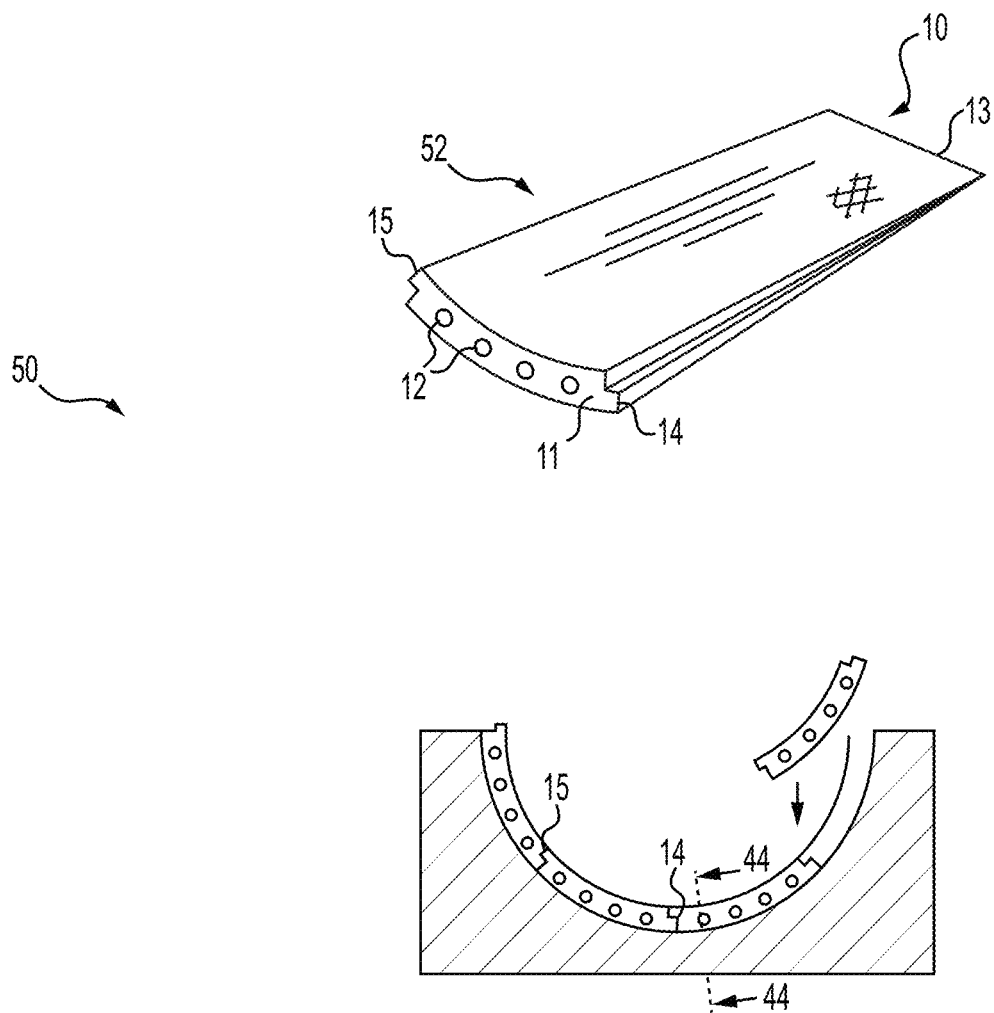
FIG. 5 illustrates a cross-sectional view of the root laminate and the root region of the wind turbine blade of FIGS. 1-3.
Figure 6:
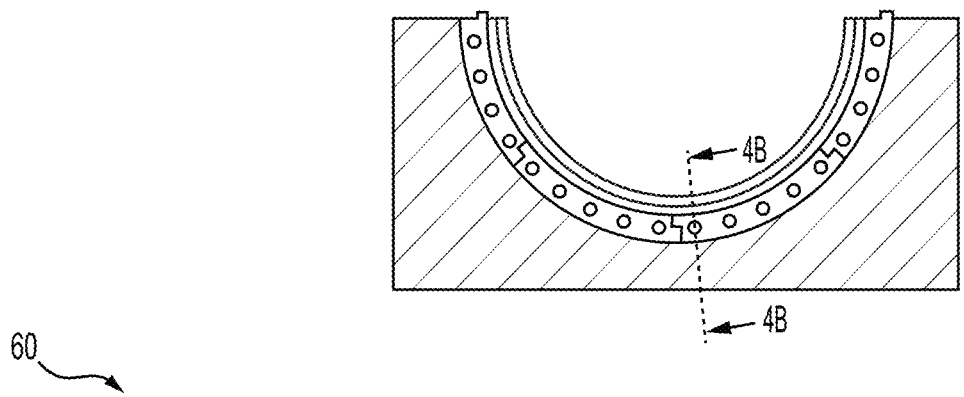
FIG. 6 illustrates an alternative cross-sectional view of the root laminate and the root region of the wind turbine blade of FIGS. 1-3.
Figure 6:
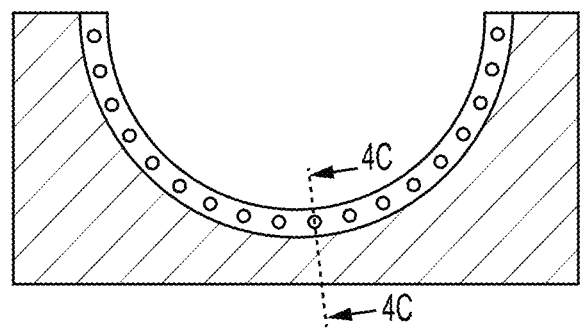

FIG. 4 illustrates a cross-sectional view 40 of the root region of the wind turbine blade of FIGS. 1-3. FIG. 5 illustrates a cross-sectional view 50 of the root laminate 52 and the root region of the wind turbine blade of FIGS. 1-3. FIG. 6 illustrates an alternative cross-sectional view 60 of the root laminate 52 and the root region of the wind turbine blade of FIGS. 1-3.

Most modern day wind turbine blades are manufactured with either carbon or glass fiber reinforced plastic. As is well known in the art, at the root (hub) end of the blade, this is typically glass fiber combined with epoxy resin (and sometimes polyester, vinyl ester and polyurethane resin families). The typical manufacturing methods are vacuum resin infused or prepreg methods.

The thickness of the laminate 52 required at the root end can be very high when compared to some other parts of the wind turbine blade and is often in the range of 50 mm-80 mm thick but with more modern blades can be up to 150 mm thick. This high thickness can cause manufacturing problems. When the resin system is curing, it generates heat in an exothermic reaction. In the thick areas of the root, the heat generated can become so much that it causes damage with the finished component such that it cannot be used.

A typical method of forming the root end is shown in FIGS. 4, 5 and 6. In this, the matrix of dry fabric is laid up in the mold of a suitable shape. The resin is then infused and cured to the finished part as shown in FIG. 4. Once the root component of the blade is cured, it is then typically transferred to a drilling location where a number of holes 4 are drilled in the end of the root laminate to allow metal root inserts with female screw threads to be bonded or mechanically fixed in place. Two semi-circular sub-assemblies are then joined together to make the finished root end joint as shown in FIG. 4.

As illustrated in the figures, the first preformed part 52 may start at the root of the wind turbine blade and the last preformed part end at the tip of the blade, creating a continuous line of preformed parts each covering a section of the blade. However, the preformed parts may also start and end at other positions, e.g. start and end at some distance from the root and the tip.

Further, one or more preformed parts may cover different sections of the wind turbine blade, e.g. a section at the center and the root of the blade with an uncovered section in between or simply one preformed part covering one section of the blade. The preformed parts are preferably adapted to form an aerodynamic profile with the wind turbine blade in relation to the wind.

A number of segments as shown in FIGS. 4, 5, and 6 are used to construct a root end joint by a wind turbine. Each of the segments has a connection end into which a plurality of holes is formed and an opposite end. The segment has the general shape of segment of a hollow cylinder which tapers in thickness from the connection end to the opposite end. In general, it is intended that 16 segments (8 in each half) will be connected together to form the complete the root end. In this case, each segment will subtend an angle of 22.5° at the center of the hub.

However, there may be as few as 4 such segments (2 in each half) subtending an angle of 90°, or more than 16 segments for larger blades which will subtend a correspondingly smaller angle. On each side of the segment, typically there is a key 14, 15 designed to locate and interlock with the corresponding key on an adjacent segment.

Typically, each segment will be 2000 mm long and 500 mm wide. At the connection end, there is a significant amount of uni-directional fiber with a small percentage of bi-axial fiber. The amount of fiber moves towards the opposite end 13 where it ends up being 1 ply layer thick. Depending on its application (infusion or prepreg blade root), the root segment is made in one of two ways.

For an infusion blade, it can be made by wet lamination with vacuum, vacuum resin infusion, resin transfer molding or similar process. The first layers of the fiber are laid into the tool, then metallic inserts or tubular spacers are placed into the tool and held in position with an alignment frame at the end of the tool. The alignment frame allows the accurate positioning of the inserts. The final layers of fiber are then placed into the tool. The whole lay-up is then placed under vacuum and the resin is either infused or injected and then fully cured.

For a prepreg blade, the process is very similar, except that layers of prepreg are inserted into the tool instead of the layers of fiber. The prepreg layup is then placed under vacuum and partially cured such that it becomes a semi-cured preform.

Alternatively, the segments can be made without the inserts or spacers 16 and the holes are drilled in a subsequent step in a separate jig. Once the individual root segments are made, they can undergo a quality assurance process to assess the structural integrity of the segments and also to assess the integrity of the inserts. The inserts may be conventional metallic inserts that are well known in the art. Alternatively, they may be the inserts disclosed in our earlier WO 2010/041008.

The assembly of the root end joint is shown in FIGS. 4, 5, and 6. In FIG. 4, four segments are shown to make up one half of the root end joint. In practice, there will typically be eight. The segments are placed in a tool having a generally semi-circular configuration prior to any other laminate being placed into the tool. The root end of the insert is connected to an alignment frame and are bolted in place using bolts 16. This ensures that the alignment of the bolt circle is maintained during the manufacturing process. In step b), once the segments are accurately positioned, the rest of the blade laminate is laid up. The laminate effectively forms a very long scarf joint with the tapering laminate in the root segment. Once all of the laminate has been laid up, the blade is placed under vacuum and is infused with resin (if it is an infusion blade) or is simply cured (if it is a prepreg blade). The blade half is then complete ready for final assembly of the two blade halves as normal.

Figure 7:
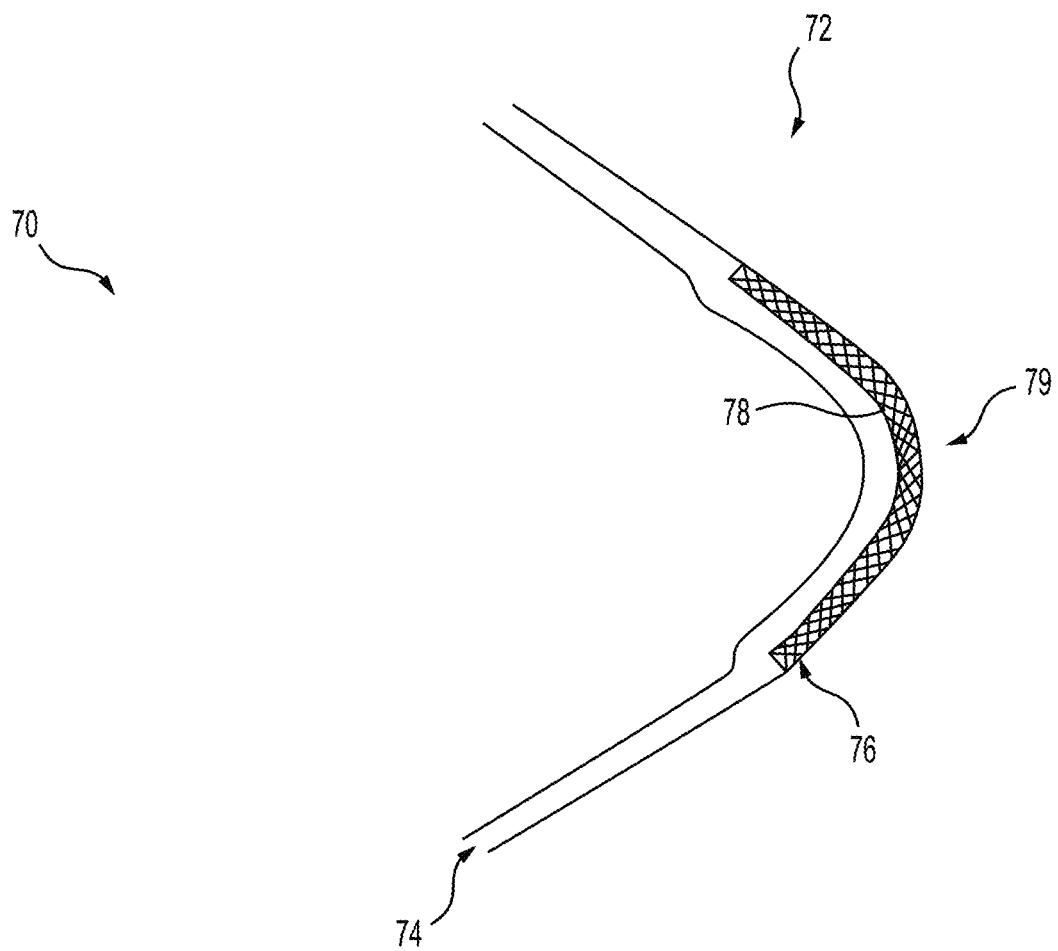
FIG. 7 is a cross-sectional view of an aerodynamic fairing of the wind turbine blade of FIGS. 1-3.

FIG. 7 is a cross-sectional view 70 of an aerodynamic fairing of the wind turbine blade of FIGS. 1-3. Referring to FIG. 7, aerodynamic fairing laminate 72 is shown. The aerodynamic fairing laminate 72 is formed from a fairing 74 and a preform 76 fixed to an outer surface 78 of the fairing 74 at the leading edge 79 of the fairing laminate 72.

Referring to FIG. 7, the preform 76 comprises a thermoplastic film outer layer fused to a fiber substrate. The thermoplastic film is formed from an aliphatic polyurethane, which is approximately 600 microns thick and may be produced using long and short chain polyether, polyester, or caprolactone glycols. The polyether types have better hydrolytic stability and low-temperature flexibility, the polyester types have better mechanical properties, and caprolactones offer a good compromise between the properties of the polyether and polyester types. In this example, caprolactone glycols are used. This results in film having a Shore A hardness of approximately 75 to 95, an elongation of at least 300% and a surface energy in the region of 40 to 44 mN/m. The fiber substrate is a glass fiber fabric preform which is multiaxial and has a weight of approximately 150 g/m2.

In operation, the preform 76 is placed into a mold with the thermoplastic film against the surface of the mold. Following this, layers of prepreg, which are formed from glass or carbon fibers pre-impregnated with an epoxy resin, are placed onto the preform 76 to form the typical composite laminate required for a fairing.

The preform 76 and the layers of prepreg are then co-cured under a vacuum and at a temperature of between 60 to 130° C. for approximately 12 hours in the same manner as for normal prepreg processing. As the stack of the layer 74 and the layers of prepreg is cured, resin from the prepreg migrates into and impregnates the fiber substrate. The resin then fully cures to form the fairing 74 from the prepreg and to fix the preform 76 to the composite body 74. In doing so, the resin forms a continuous matrix through the composite body 74 and the preform 76 to firmly bond the two layers together. The resin also forms a chemical connection with the thermoplastic film, further strengthening the fixation of the preform 76 to the composite body 74. Thus, the resulting interface between the fairing 74 and the preform 76 is well controlled and the fairing 74 and fiber substrate provide a very high quality substrate directly beneath the thermoplastic film.

Since the fairing 74 and the preform 76 are co-cured, the fairing 74 is shaped around the preform 76 so that the edges of the preform 76 lie flush with the fairing 74. This gives the resulting fairing laminate 72 a smooth outer profile, as shown in FIG. 7. This smooth profile reduces the impact of the preform 76 on aerodynamic performance and avoids presenting free edges which could otherwise lead to the preform 76 being more easily removed from the fairing 74.

Figure 8:
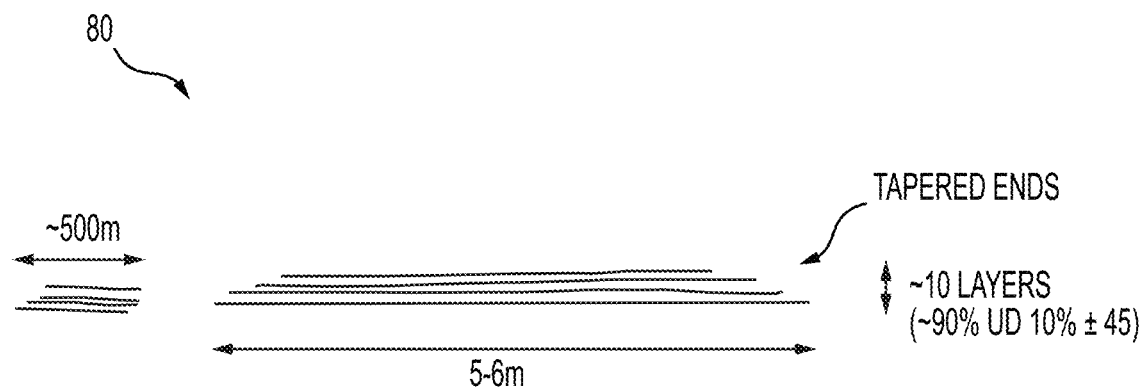
FIG. 8 is a side and cross-sectional view of the main laminate of the wind turbine blade of FIGS. 1-3.
Figure 9:
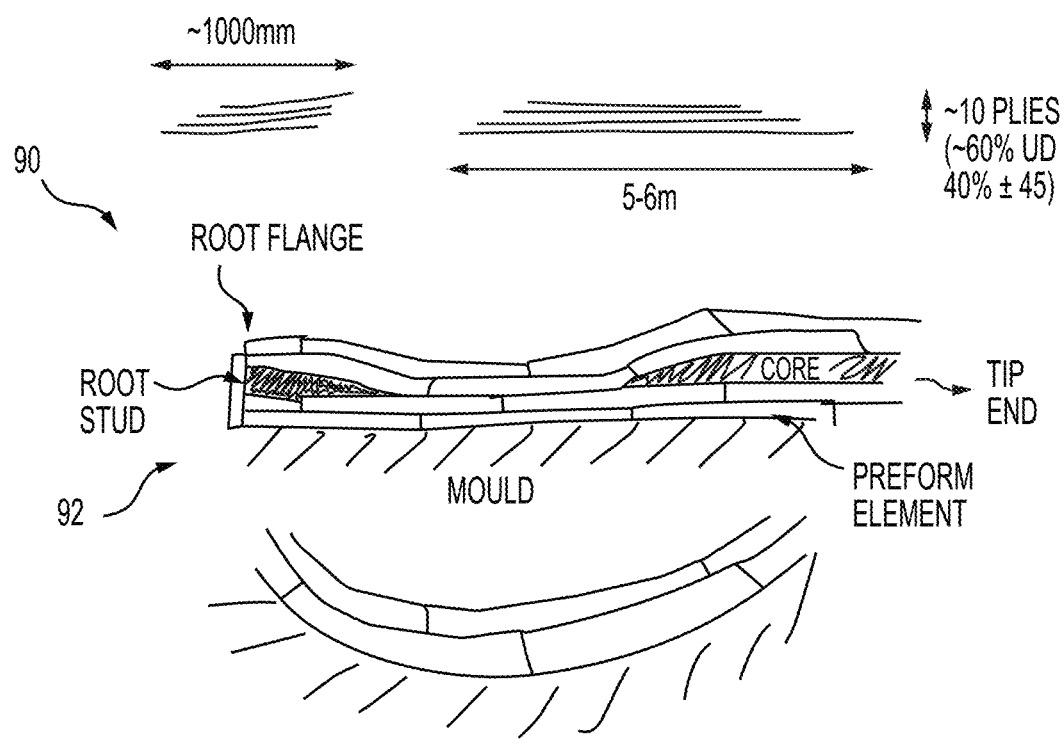
FIG. 9 is a cross-sectional view of the spar cap laminate, root laminate and the aerodynamic fairing laminate in accordance with one embodiment of the wind turbine blade of FIGS. 1-3.
Figure 10:
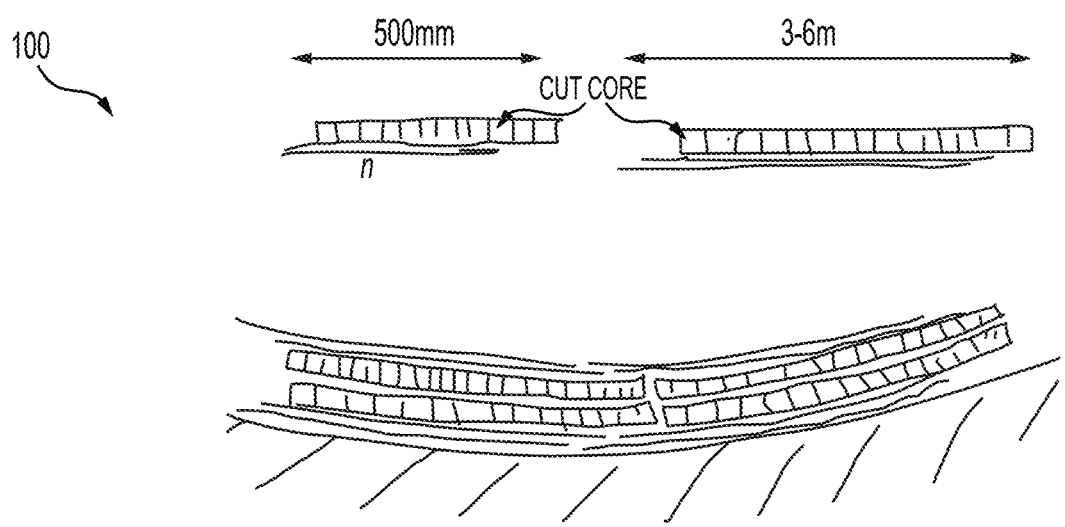
FIG. 10 is a cross-sectional view of the spar cap laminate, root laminate and the aerodynamic fairing laminate in accordance with an alternative embodiment of the wind turbine blade of FIGS. 1-3.

FIG. 8 is a side and cross-sectional view of the main laminate of the wind turbine blade of FIGS. 1-3. FIG. 9 is a cross-sectional view of the spar cap laminates 34 and 35 (FIG. 3), root laminate 52 (FIG. 5) and the aerodynamic fairing laminate 72 in accordance with one embodiment of the wind turbine blade of FIGS. 1-3. FIG. 10 is a cross-sectional view of the spar cap laminates 34, 35, root laminate 52 and the aerodynamic fairing laminate 72 in accordance with an alternative embodiment of the wind turbine blade of FIGS. 1-7.

In one embodiment of the invention, the preform components may be constructed of a continuous fibrous material, organic or inorganic, and impregnated with resin, such as epoxy, vinyl-ester, polyester, or the like as is known in the art. Referring to FIG. 9, the fibrous material of the preform component 92 may have a woven configuration and may be constructed from, for example, carbon, glass, synthetic material, or the like as is known in the art. The preform component 92 may have a length shorter than the desired length of the spar cap laminates 34, 35, root laminate 52 and the aerodynamic fairing laminate 72 and, therefore, multiple preform components 92 may be attached together to form the entire spar cap laminates 34, 35, root laminate 52 and the aerodynamic fairing laminate 72.

Each preform component 92 may typically have a swept contour so that when they are assembled together to form the spar cap laminates 34, 35, root laminate 52 and the aerodynamic fairing laminate 72 they will have the desired swept shape, or banana shape, following the shape of a swept-shaped rotor blade. It should also be appreciated that the preform component 92 may be substantially straight and may be used to assemble a substantially straight spar cap laminates 34, 35, root laminate 52 and the aerodynamic fairing laminate 72 in the same manner as just described. The preform component 92 may have a first angled end forming an obtuse angle with the top side of the preform component 92. The preform component may have a second angled end, opposite the first angled end, forming an acute angle with the top side of the preform component 92. The second angled end may be formed at a supplementary angle to the angle of the first angled end. When attaching multiple preform components 92 together, the first angled end of a first preform component 92 may align and mate with the second angled end of a second preform component 92, forming a scarf joint.

In operation, multiple preform components may be attached to form the spar cap laminates 34, 35, root laminate 52 and the aerodynamic fairing laminate 72. The first preform component 92, having the first angled end, may be mated with the second preform component 92, having the second angled end, placing an intervening joint interface layer in between the two angled ends, and creating an exemplary and non-limiting scarf joint. The joint interface layer may be a polymer material and may further include a fiber substrate, such as fiberglass or the like as is known in the art. One or more pins may be inserted through the mated scarf joint. The pins may be constructed from a rigid material such as a sturdy metal; however, the pins need not be metallic. Further, the pins need not be cylindrical in shape, but may be any shape that will form continuous contact through the scarf joint and the first and second preform component 92, such as a flat sheet, a ridged sheet, or the like. The pins further strengthen the scarf joint in the out-of-plane direction while also maintain alignment between the contiguous preform components 92 while forming the entire spar cap laminates 34, 35, root laminate 52 and the aerodynamic fairing laminate 72.

In another exemplary embodiment of the invention multiple preform components may have one or more facing plies on at least one side of the spar cap laminates 34, 35, root laminate 52 and the aerodynamic fairing laminate 72 and covering the scarf joints. The facing plies may be a polymer material and may further include a fiber substrate, such as fiberglass or the like as is known in the art. The facing plies, like the pins, further strengthen the scarf joint and maintain alignment between the contiguous preform components 92. It is appreciated that while the facing plies on only one side of the spar cap laminates 34, 35, root laminate 52 and the aerodynamic fairing laminate 72 the facing plies may be applied to either or both sides of the spar cap laminates 34, 35, root laminate 52 and the aerodynamic fairing laminate 72. It is also contemplated that multiple preform components 92 may be joined in a side-by-side configuration as well as an end-to-end configuration. In this embodiment, the sides of each preform component 92 may have supplementary acute and obtuse angles so a scarf joint, like that described above, may be formed between the preform components 92 sitting side-by-side as well as end-to-end.

In operation, an appropriate molding tool may be used to fabricate the spar cap laminates 34, 35, root laminate 52 and the aerodynamic fairing laminate 72 from multiple preformed components 92. Because the preform components 92 may be flat when first received from the manufacturer, the molding tool may be used to form the preform components 92 into an arcuate, rather than flat, shape. The arcuate shape will follow the arc of the rotor blade from the leading edge to the trailing edge as is shown in FIG. 2. The molding tool includes a convex form with a surface having a convex curve following the arcuate shape of the first shell or the second shell of the rotor blade. To form the spar cap laminates 34, 35, root laminate 52 and the aerodynamic fairing laminate 72, multiple preform components 92 may be laid over the convex form and aligned end-to-end.

The convex form also may include one or more alignment fences that will communicate with one side of the preform components 92 when laid on the convex form, further maintaining alignment of the contiguous preform components 92. In an exemplary embodiment, one alignment fence, or a series of alignment fences, are placed on each side of the convex form and opposite each other to hold the preform components 92 in place. Finally, the alignment fence may include alignment markings along the length of the fence to identify where to align each of the preform components 92. In one embodiment of the present invention, two different molding tools may be employed, whereby a first molding toot includes the convex mold form having the shape of the first shell forming the top skin of the rotor blade and whereby a second molding tool includes the convex mold form having the shape of the second shell forming the bottom skin of the rotor blade.

After final construction and integration with the rotor blade, spar cap laminates 34, 35, root laminate 52 and the aerodynamic fairing laminate 72 may include multiple preform components 92 lying end-to-end and attached by the scarf joint. It should be appreciated that the width of the multiple preform components 92 may not be the same, allowing the spar cap laminates 34, 35, root laminate 52 and the aerodynamic fairing laminate 72 to narrow at one or both ends and remain wider in the middle sections. Further, the thickness of the multiple preform components 92 may not be the sane, allowing for the spar cap laminates 34, 35, root laminate 52 and the aerodynamic fairing laminate 72 to taper in thickness at one or both ends and remain thicker in the middle sections. It should further be appreciated that, any number of the preform components 92 may be used to achieve the necessary length and the desired swept shape contour, considering the size and availability of the preform components 92. Additionally, whereas FIGS. 8-10 show a swept-shaped spar cap laminates 34, 35, root laminate 52 and the aerodynamic fairing laminate 72, it should be appreciated that a generally straight-shaped spar cap laminates 34, 35, root laminate 52 and the aerodynamic fairing laminate 72 may be formed from multiple preform components 92 not having a curved shape.

It should be apparent that the foregoing relates only to exemplary embodiments of the present application and that numerous changes and modifications may be made herein by one of ordinary skill in the art without departing from the general spirit and scope of the invention as defined by the following claims and the equivalents thereof.

Figure 11:
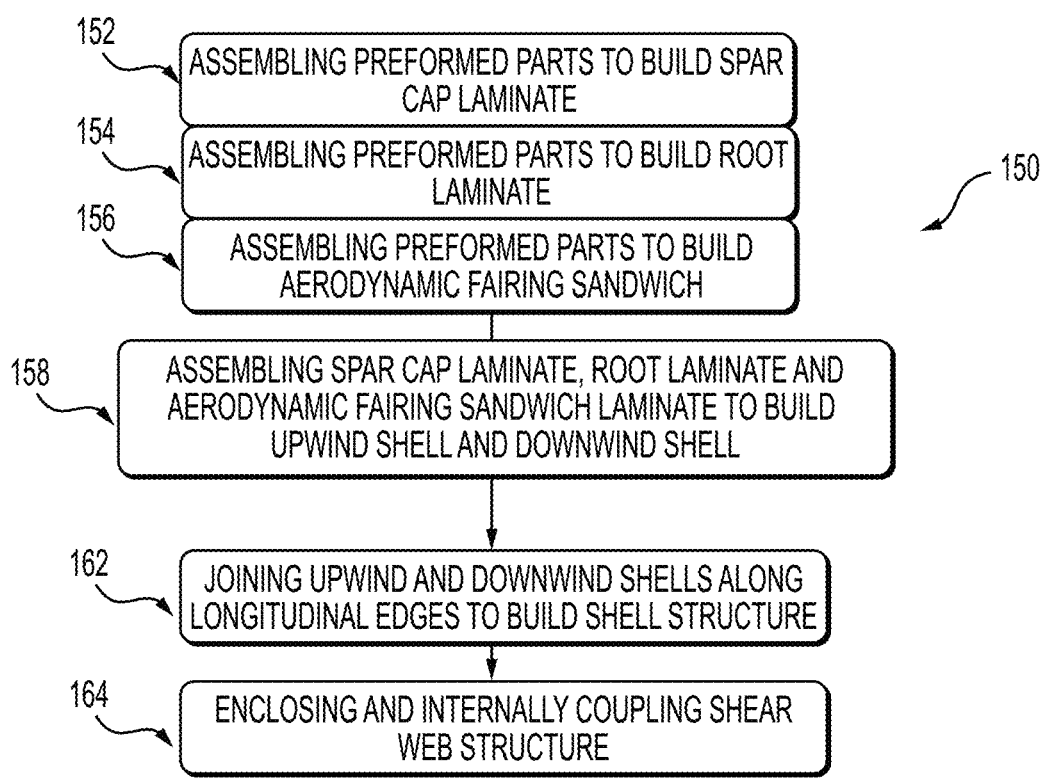
FIG. 11 illustrates a flow chart of the manufacturing of a wind turbine blade including a preferred embodiment of a preformed part according to the invention.

FIG. 11 illustrates a flow chart of a method 150 of manufacturing a wind turbine blade including a preferred embodiment of a preformed part according to the invention. The manufacturing method 150 includes the steps: joining (152) at least one upwind shell and at least one downwind shell along a first longitudinal edge and a second longitudinal edge to form a shell structure; making a spar cap laminate (154) from a plurality of preformed parts; making a root laminate (156) from a plurality of preformed parts; making an aerodynamic fairing laminate (158) from a plurality of preformed parts; assembling (162) the spar cap laminate, the root laminate and the aerodynamic fairing laminate into the shell structure and enclosing and internally coupling (164) the shear web structure.

A technical contribution for the disclosed method and apparatus is that it provides for a wind turbine blade made from a number of preformed parts that can be made at a different places at different times and assembled together. The technical contribution also includes a method of manufacturing the wind turbine blade from a number of preformed parts that can be made at a different places at different times.

According to one aspect of the present invention, there is provided a wind turbine blade including a shell structure defining a leading edge and a trailing edge, and an upwind shell and a downwind shell joined along at least one of the leading edge or the trailing edge. The shell structure includes an assembly of preformed parts processed into a collection of prefabricated laminates.

According to a second aspect of the present invention, there is provided a method of manufacturing a wind turbine blade. The method includes processing a number of preformed parts into a collection of prefabricated laminates and assembling the collection of prefabricated laminates to build a shell structure defining a leading edge and a trailing edge.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description, but is only limited by the scope of the appended claims.

LIST

1. Wind turbine
2. Wind turbine tower
3. Wind turbine nacelle
4. Wind turbine hub
5. Wind turbine blade
20 isometric view of wind turbine blade
11 shell structure
12 downwind shell
14 upwind shell
16 shear web structure
24 web
26 leading edge
28 trailing edge
30 perspective view of wind turbine blade
32 blade segment
34 first spar cap
35 second spar cap
36 skin
38 bulkhead
39 web
40 cross-sectional view of the root region
50 alternative cross-sectional view of the root region
52 root laminate
60 alternative cross-sectional view of the root region
70 cross-sectional view of an aerodynamic fairing
72 aerodynamic fairing laminate
74 fairing
76 preform
78 outer surface
79 leading edge of fairing laminate 72
80 side and cross-sectional view of the main laminate
90 cross-sectional view of the spar cap laminate, root laminate and the aerodynamic fairing laminate
92 preformed part or component
100 cross-sectional view of the spar cap laminate, root laminate and the aerodynamic fairing laminate
150 method of manufacturing a wind turbine blade
152 assembling preformed parts to build spar cap laminate
154 assembling preformed parts to build root sandwich
156 assembling preformed parts to build aerodynamic fairing sandwich
158 assembling spar cap laminate, root laminate and aerodynamic fairing laminate to build upwind shell and downwind shell
162 joining upwind and downwind shells along longitudinal edges to build shell structure
164 enclosing and internally coupling shear web structure

What is claimed is:

1. A wind turbine blade comprising:
   a shell structure defining a leading edge and a trailing edge; and
   an upwind shell and a downwind shell joined along at least one of said leading edge and said trailing edge, wherein said shell structure comprises:
   a spar cap laminate made from a first plurality of spar cap preformed parts;
   a root laminate made from a second plurality of blade root preformed parts; and
   an aerodynamic fairing laminate made from a third plurality of aerodynamic fairing preformed parts.

2. The wind turbine blade according to claim 1, wherein each of said first plurality of spar cap preformed parts, said second plurality of blade root preformed parts, and said third plurality of aerodynamic fairing preformed parts has a mass less than 100 kg and wherein each of said first plurality of spar cap preformed parts, said second plurality of blade root preformed parts, and said third plurality of aerodynamic fairing preformed parts is less than 7.5 m in length.

3. The wind turbine blade according to claim 1, wherein each of said first plurality of spar cap preformed parts, said second plurality of blade root preformed parts, and said third plurality of aerodynamic fairing preformed parts is created flat and configured to take a shape of the blade when assembled in plurality.

4. The wind turbine blade according to claim 1, wherein more than 60% of said first plurality of spar cap preformed parts, more than 60% of said second plurality of blade root preformed parts, and more than 60% of said third plurality of aerodynamic fairing preformed parts are identical.

5. The wind turbine blade according to claim 1, wherein each of said first plurality of spar cap preformed parts, said second plurality of blade root preformed parts, and said third plurality of aerodynamic fairing preformed parts comprises one or more of:
   thermosetting or thermoplastic resin and further wherein each of said plurality of preformed parts comprises one or more of: no fiber, short fiber or continuous fiber.

6. A method of manufacturing the wind turbine blade according to claim 1, said method comprising:
   processing a number of preformed parts into a collection of prefabricated laminates;
   assembling said collection of prefabricated laminates to build the shell structure defining the leading edge and the trailing edge, wherein said assembling said collection of prefabricated laminates comprises:
   assembling the first plurality of spar cap preformed parts to build a first plurality of spar cap laminates;
   assembling the second plurality of blade root preformed parts to build a second plurality of blade root laminates;
   assembling the third plurality of aerodynamic fairing preformed parts to build a third plurality of aerodynamic fairing laminates; and
   assembling said first plurality of spar cap laminates, said second plurality of blade root laminates and said third plurality of aerodynamic fairing laminates to build said upwind shell and said downwind shell.

7. The method of claim 6, wherein each of said first plurality of spar cap preformed parts, said second plurality of blade root preformed parts, and said third plurality of aerodynamic fairing preformed parts has a mass less than 100 kg and wherein each of said first plurality of spar cap preformed parts, said second plurality of blade root preformed parts, and said third plurality of aerodynamic fairing preformed parts is less than 7.5 m in length.

8. The method of claim 6, wherein each of said first plurality of spar cap preformed parts, said second plurality of blade root preformed parts, and said third plurality of aerodynamic fairing preformed parts is created flat and configured to take a shape of the blade when assembled in plurality.

9. The method of claim 6, wherein more than 60% of said first plurality of spar cap preformed parts, more than 60% of said second plurality of blade root preformed parts, and more than 60% of said third plurality of aerodynamic fairing preformed parts are identical.

10. The method of claim 6, wherein each of said first plurality of spar cap preformed parts, said second plurality of blade root preformed parts, and said third plurality of aerodynamic fairing preformed parts comprises one or more of thermosetting resin and thermoplastic resin, and wherein each of said plurality of preformed parts comprises one or more of no fiber, short fiber and continuous fiber.

11. The wind turbine blade of claim 1, wherein at least one preformed part of the first plurality of spar cap preformed parts, the second plurality of blade root preformed parts, and the third plurality of aerodynamic fairing preformed parts comprises at least two layers of fabric held together retention means different from a cured resin of the respective the spar cap laminate, the root laminate made from, and the aerodynamic fairing laminate.

12. The wind turbine blade of claim 1, wherein a majority of preformed parts of the first plurality of spar cap preformed parts, the second plurality of blade root preformed parts, or the third plurality of aerodynamic fairing preformed parts are identical.

13. The wind turbine blade of claim 1, wherein at least two preformed parts of the first plurality of spar cap preformed parts, the second plurality of blade root preformed parts, and the third plurality of aerodynamic fairing preformed parts are joined in an end-to-end configuration.

14. The wind turbine blade of claim 1, wherein at least two preformed parts of the first plurality of spar cap preformed parts, the second plurality of blade root preformed parts, and the third plurality of aerodynamic fairing preformed parts are joined in a side-by-side configuration.

15. The wind turbine blade of claim 1, wherein at least one preformed part of the first plurality of spar cap preformed parts, the second plurality of blade root preformed parts and the third plurality of aerodynamic fairing preformed parts has a length shorter than the length of the respective spar cap laminate, the root laminate, and the aerodynamic fairing laminate.

16. The wind turbine blade of claim 1, wherein at least one preformed part of the first plurality of spar cap preformed parts, the second plurality of blade root preformed parts and the third plurality of aerodynamic fairing preformed parts has a first angled end formed at an angle and a second angled end formed at a supplementary angle to the angle of the first angled end.

17. The wind turbine blade of claim 1, wherein a first preformed part of the first plurality of spar cap preformed parts, the second plurality of blade root preformed parts and the third plurality of aerodynamic fairing preformed parts has an angled end formed at an angle, and a second preformed part of the first plurality of spar cap preformed parts, the second plurality of blade root preformed parts and the third plurality of aerodynamic fairing preformed parts has a angled end formed at a supplementary angle to the angle of the angled end of the first preformed part so that the angled end of the first preformed part align and mate with the angled end of the second preformed part forming a scarf joint.

18. The wind turbine blade of claim 17, further comprising a joint interface layer arranged between the angled end of the first preformed part and the angled end of the second preformed part.

19. The wind turbine blade of claim 17, further comprising at least one pin inserted through the scarf joint between the first preformed part and the second preformed part.

20. The wind turbine blade of claim 17, further comprising at least one facing ply covering the scarf joint on at least one side of the corresponding spar cap laminate, the root laminate, and the aerodynamic fairing laminate.

* * * * *